United States Patent

Mulaskey et al.

Patent Number: 5,279,998
Date of Patent: Jan. 18, 1994

[54] ZEOLITIC CATALYST

[75] Inventors: Bernard F. Mulaskey, Fairfax; John V. Heyse, Crockett, both of Calif.

[73] Assignee: Chevron Research and Technology Company, San Francisco, Calif.

[21] Appl. No.: 916,230

[22] Filed: Jul. 17, 1992

[51] Int. Cl.5 .......................... B01J 29/10; B01J 29/24
[52] U.S. Cl. .......................................... 502/74; 502/66
[58] Field of Search ................................... 502/66, 74

[56] References Cited

U.S. PATENT DOCUMENTS

| | | | |
|---|---|---|---|
| 3,960,710 | 6/1976 | Pollitzer et al. | 208/139 |
| 4,382,023 | 5/1983 | Mulaskey | 252/455 |
| 4,487,848 | 12/1984 | Robinson et al. | 502/223 |
| 4,522,935 | 6/1985 | Robinson et al. | 502/223 |
| 4,529,505 | 7/1985 | Robinson et al. | 208/139 |
| 4,645,752 | 2/1987 | Dufresne et al. | 502/66 |
| 4,663,020 | 5/1987 | Fleming | 208/65 |
| 4,681,865 | 7/1987 | Katsuno et al. | 502/74 |
| 5,032,561 | 7/1991 | Onodera | 502/66 |

FOREIGN PATENT DOCUMENTS 8904818  6/1989  PCT Int'l Appl. .................. 502/66

Primary Examiner—Carl F. Dees
Attorney, Agent, or Firm—T. G. DeJonghe; E. A. Schaal

[57] ABSTRACT

The exterior of a platinum-zeolite L catalyst is treated with metallic tin particles having an average particle size of between 1 and 5 microns so that at least 95% of the platinum present in the catalyst is unreacted with the tin.

10 Claims, No Drawings

ZEOLITIC CATALYST

The present invention relates to a zeolitic catalyst having improved activity and low fouling rate.

BACKGROUND OF THE INVENTION

Catalytic reforming is well known in the petroleum industry and involves the treatment of naphtha fractions to improve octane rating by the production of aromatics. The more important hydrocarbon reactions which occur during the reforming operation include the dehydrogenation of cyclohexanes to aromatics, dehydroisomerization of alkylcyclopentanes to aromatics, and dehydrocyclization of acyclic hydrocarbons to aromatics. A number of other reactions also occur, including the dealkylation of alkylbenzenes, isomerization of paraffins, and hydrocracking reactions which produce light gaseous hydrocarbons, e.g., methane, ethane, propane and butane. It is important to minimize hydrocracking reactions during reforming as they decrease the yield of gasoline boiling products and hydrogen.

Because there is a demand for high octane gasoline, extensive research has been devoted to the development of improved reforming catalysts and catalytic reforming processes. Catalysts for successful reforming processes must possess good selectivity. That is, they should be effective for producing high yields of liquid products in the gasoline boiling range containing large concentrations of high octane number aromatic hydrocarbons. Likewise, there should be a low yield of light gaseous hydrocarbons. The catalysts should possess good activity to minimize excessively high temperatures for producing a certain quality of products. It is also necessary for the catalysts to either possess good stability in order that the activity and selectivity characteristics can be retained during prolonged periods of operation; or be sufficiently regenerable to allow frequent regeneration without loss of performance.

Catalytic reforming is also an important process for the chemical industry. There is an increasingly larger demand for aromatic hydrocarbons for use in the manufacture of various chemical products such as synthetic fibers, insecticides, adhesives, detergents, plastics, synthetic rubbers, pharmaceutical products, high octane gasoline, perfumes, drying oils, ion-exchange resins, and various other products well known to those skilled in the art.

An important technological advance in catalytic reforming has recently emerged which involves the use of large-pore zeolite catalysts. These catalysts are further characterized by the presence of an alkaline earth metal and are charged with one or more Group VIII metals. This type of catalyst has been found to advantageously provide higher selectivity and longer catalytic life than those previously used.

Having discovered selective catalysts with acceptable cycle lives, successful commercialization seemed inevitable. Unfortunately, it was subsequently discovered that the highly selective, large pore zeolite catalysts containing a Group VIII metal were unusually susceptible to sulfur poisoning. See U.S. Pat. No. 4,456,527, which is hereby incorporated by reference for all purposes. Ultimately, it was found that to effectively address this problem, sulfur in the hydrocarbon feed should be at ultra-low levels, preferably less than 100 parts per billion (ppb), more preferably less than 50 ppb to achieve an acceptable stability and activity level for the catalysts.

While low sulfur systems were initially effective, it was discovered that a shut down of the reactor system can be necessary after only a matter of weeks. The reactor system of one test plant had regularly become plugged after only such brief operating periods. Not surprisingly, the plugs were found to be those associated with coking. However, although coking is a common problem in hydrocarbon processing, the extent and rate of coking associated with this particular system far exceeded any expectation. See U.S. Ser. No. 666,696, entitled "Low Sulfur Reforming Processes," filed Sep. 3, 1991 (and now abandoned), which is hereby incorporated by reference for all purposes. That application discloses a reactor system of improved resistance to carburization and metal dusting under conditions of low sulfur. At least a portion of the reactor system in contact with the hydrocarbons is tin.

SUMMARY OF THE INVENTION

The present invention provides a zeolitic catalyst having improved activity and low fouling rate. The exterior of that catalyst is treated with metallic tin particles having an average particle size of less than 200 microns. Preferably, the average particle size of the tin particles is less than 100 microns. More preferably, the average particle size of the tin particles is between 1 and 50 microns. Even more preferably, the average particle size of the tin particles is between 1 and 5 microns. We have discovered that the tin particles improve catalyst activity and reduce the catalyst fouling rate.

The catalyst has at least one Group VIII metal, such as platinum. Preferably, the zeolitic support is zeolite X, zeolite Y, or zeolite L. More preferably, the zeolitic support is zeolite L.

At least 80% of the Group VIII metal present in the catalyst should be unreacted with the tin. Preferably, at least 90% of the Group VIII metal present in the catalyst is unreacted with the tin. More preferably, at least 95% of the Group VIII metal present in the catalyst is unreacted with the tin.

In one embodiment, a hydrocarbon feed is reformed in a reactor under reforming conditions with a catalyst comprising at least one Group VIII metal on a zeolitic support, wherein the exterior of the catalyst and the interior of the reactor are both treated with tin particles having an average particle size of less than 200 microns.

DETAILED DESCRIPTION OF THE INVENTION

In its broadest aspect, the present invention involves a tin-treated catalyst having improved activity and low fouling rate.

The exterior of the catalyst is treated with tin particles having an average particle size of less than 200 microns. The tin is added to the finished catalyst. It is not impregnated into the catalyst, it is not in the micro or macro pore structure, and it is not interacting with the Group VIII metal of the catalyst.

Preferably, the average particle size of the tin particles is less than 100 microns. More preferably, the average particle size of the tin particles is between 1 and 50 microns. Even more preferably, the average particle size of the tin particles is between 1 and 5 microns. The reason for the small size of the tin particles is to minimize the amount of tin required. Small particle size tin also improves contact of the tin with the exterior of the catalyst. Small particle size also minimizes the distance between the tin metal particles and the exterior of the catalyst surface. and minimizes the likelihood of tin being removed by high gas velocities.

The tin particulates are distributed on the catalyst by a simple mixing of the very finely divided tin powder with the active catalyst. The 1 to 5 micron powder tends to easily stick to and coat the catalyst when either the catalyst is pretreated with tin or the tin and the catalyst are poured together into the reactor. As much as 10 wt % of the tin dust can be intermixed with the catalyst without interfering with the flow of hydrogen and feed vapors through the catalyst bed.

At least 80% of the Group VIII metal present in the catalyst should be unreacted with the tin. Preferably, at least 90% of the Group VIII metal present in the catalyst is unreacted with the tin. More preferably, at least 95% of the Group VIII metal present in the catalyst is unreacted with the tin. By "unreacted with the tin," we mean that the active Group VIII metal sites remain unreacted with the tin.

It is well known that tin is used to improve the selectivity of platinum-containing reforming catalysts, as exemplified by U.S. Pat. No. 3,631,215, which is hereby incorporated by reference for all purposes. In the present invention, we have found that it is essential to avoid contact of the tin with the internal platinum active sites. This is especially important in the case of low sulfur systems, since the tin tends to act like sulfur in poisoning the dehydrocyclization activity of active sites.

The catalyst is a non-acidic catalyst having a non-acidic zeolite support charged with one or more dehydrocyclization constituents. Among the zeolites useful in the practice of the present invention are type L zeolite, zeolite X, and zeolite Y. These zeolites have apparent pore sizes on the order of 7 to 9 Angstroms.

Zeolite L is a synthetic crystalline zeolitic molecular sieve which may be written as:

$$(0.9-1.3)M_{2/n}O:Al_2O_3(5.2-6.9)SiO_2:yH_2O$$

wherein M designates a cation, n represents the valence of M, and y may be any value from 0 to about 9. Zeolite L, its X-ray diffraction pattern, its properties, and method for its preparation are described in detail in U.S. Pat. No. 3,216,789. U.S. Pat. No. 3,216,789 is hereby incorporated by reference to show the preferred zeolite of the present invention. The real formula may vary without changing the crystalline structure; for example, the mole ratio of silicon to aluminum (Si/Al) may vary from 1.0 to 3.5. Zeolite X is a synthetic crystalline zeolitic molecular sieve which may be represented by the formula:

$$(0.7-1.1)M_{2/n}O:Al_2O_3:(2.0-3.0)SiO_2:yH_2O$$

wherein M represents a metal, particularly alkali and alkaline earth metals, n is the valence of M, and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference to show a zeolite useful in the present invention.

Zeolite Y is a synthetic crystalline zeolitic molecular sieve which may be written as:

$$(0.7-1.1)Na_2O:Al_2O_3:xSiO_2:yH_2O$$

wherein x is a value greater than 3 up to about 6 and y may be a value up to about 9. Zeolite Y has a characteristic X-ray powder diffraction pattern which may be employed with the above formula for identification. Zeolite Y is described in more detail in U.S. Pat. No. 3,130,007. U.S. Pat. No. 3,130,007 is hereby incorporated by reference to show a zeolite useful in the present invention.

The preferred dehydrocyclization catalyst is a type L zeolite charged with one or more dehydrocyclization constituents.

The zeolitic catalysts according to the invention are charged with one or more Group VIII metals, e.g., nickel, ruthenium, rhodium, palladium, iridium or platinum.

The preferred Group VIII metals is platinum, which is more selective with regard to dehydrocyclization and is also more stable under the dehydrocyclization reaction conditions than other Group VIII metals.

Group VIII metals are introduced into the large-pore zeolite by synthesis, impregnation or exchange in an aqueous solution of appropriate salt. When it is desired to introduce two Group VIII metals into the zeolite, the operation may be carried out simultaneously or sequentially.

By way of example, platinum can be introduced by impregnating the zeolite with an aqueous solution of tetrammineplatinum (II) nitrate, tetrammineplatinum (II) hydroxide, dinitrodiamino-platinum or tetrammine-platinum (II) chloride. In an ion exchange process, platinum can be introduced by using cationic platinum complexes such as tetrammineplatinum (II) nitrate.

An inorganic oxide may be used as a carrier to bind the large-pore zeolite containing the Group VIII metal. The carrier can be a natural or a synthetically produced inorganic oxide or combination of inorganic oxides. Typical inorganic oxide supports which can be used include clays, alumina, and silica, in which acidic sites are preferably exchanged by cations which do not impart strong acidity.

If desired, the non-acidic catalyst can be treated with a halogen-containing compound, such as a fluoride. Such a catalyst is disclosed in U.S. Pat. No. 4,681,865, which is hereby incorporated by reference for all purposes.

The non-acidic catalyst can be employed in any of the conventional types of equipment known to the art. It may be employed in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, it may be prepared in a suitable form for use in moving beds, or in fluidized-solid processes, in which the charging stock is passed upward through a turbulent bed of finely divided catalyst.

In one embodiment, a hydrocarbon feed is reformed in a reactor under reforming conditions with a catalyst comprising at least one Group VIII metal on a zeolitic support, wherein the exterior of the catalyst and the interior of the reactor are both treated with tin particles having an average particle size of less than 200 microns. U.S. Ser. No. 666,696, which has already been incorporated by reference, shows how the interior of a reactor can be treated with tin.

EXAMPLES

The invention will be further illustrated by following examples which set forth particularly advantageous method embodiments. While the Examples are provided to illustrate the present invention, they are not intended to limit it.

EXAMPLE I

Two runs were made with a catalyst comprising platinum on a nonacidic L-zeolite support, treated with fluoride according to the process described in U.S. Pat. No. 4,681,865. In both runs, the feed was N-hexane, the $H_2$/HC ratio was 25/1, and reactor pressure was held to 50 psig. The catalyst temperatures and space velocities were changed to convert the hexane feed to benzene product, as shown in Table I. Run 1 was a control run, without tin dust on the catalyst. In Run 2, 10 wt % tin dust was added to the catalyst. Both runs were identical, except for the addition to tin dust to the catalyst in Run 2.

TABLE I

| Conditions | Wt % Benzene Produced | |
|---|---|---|
| | Run 1 | Run 2 |
| 900° F., 2 WHSV | 16% | 74% |
| 960° F., 2 WHSV | 70% | >90% |
| 840° F., 4 WHSV | 12% | 38% |

It is apparent from Table I that the addition of tin dust to the catalyst makes it possible to achieve conversion of hexane to benzene at temperatures 60° F. lower than the control catalyst containing no tin. Under these conditions, catalyst fouling rates containing tin dust were below 0.01° F./hr.

EXAMPLE II

Three five-gram portions of a catalyst comprising 0.6 wt. % platinum on a nonacidic L-zeolite support were impregnated with varying levels of tin. The impregnations were done by the incipient wetness method using stannous chloride dissolved in methanol. The methanol solvent was evaporated by heating to 100° C. in an evaporating dish and the catalysts were calcined for 4 hours at 500° F. The final catalysts contained 0.1%, 0.3%, and 0.6% tin by weight.

The catalytic activity of these three catalysts for the conversion of light naphtha to aromatics was then determined by a standard test and compared to that of untreated catalyst. In this test, one gram of catalyst was charged to a microreactor. The catalysts were activated by heating to 500° F. in flowing nitrogen, reducing at 500° F. in flowing hydrogen, and heating to 900° F. in flowing hydrogen. The temperature was then reduced to 875° F. and the aromatization carried out at 50 psig, 4.4 naphtha weight hourly space velocity, a 5.0 hydrogen to naphtha feed molar ratio. Table II shows that the impregnation of tin into the pores of the catalyst where it could combine with the platinum had an adverse effect on catalyst performance.

TABLE II

| Effect of Tin Impregnation on Catalyst Performance | | | | |
|---|---|---|---|---|
| Tin Content | 0.0 | 0.1 | 0.3 | 0.6 |
| % Conversion | 67.5 | 60.0 | 13.1 | 4.0 |
| % Selectivity | 90.0 | 85.0 | 70.0 | 47.7 |

The catalyst used for Table III was a catalyst comprising Pt on a non-acidic L-zeolite support according to the process described in U.S. Pat. No. 4,456,527, which is hereby incorporated by reference for all purposes.

The run was made with N-hexane at 4 WHSV. The $H_2$/HC ratio was 12/1 and the pressure was held to 50 psig. We added 10 wt % of the tin dust to the reactor catalyst charge. This tin was thoroughly mixed with catalyst and placed in a reactor for life testing.

Over 72% benzene was produced from hexane throughout the run with no detectable drop in benzene production from 200 too 1200 hours of operation.

TABLE III

| Hours on Stream at 900° F. | Wt % Benzene Produced |
|---|---|
| 100 | 74 |
| 200 | 72.5 |
| 300 | 72 |
| 600 | 72 |
| 1200 | 72.5 |

It is apparent that the catalyst fouling rate with this non-halogen containing catalyst is also well below 0.01° F./hr when tin dust is added to the reactor system.

While the present invention has been described with reference to specific embodiments, this application is intended to cover those various changes and substitutions that may be made by those skilled in the art without departing from the spirit and scope of the appended claims.

What is claimed is:

1. A catalyst having improved activity and low fouling rate comprising at least one Group VIII metal on a zeolitic support, wherein the exterior of the catalyst is treated with metallic tin particles having an average particle size of less than 200 microns.

2. A catalyst according to claim 1 wherein the average particle size of the tin particles is less than 100 microns.

3. A catalyst according to claim 2 wherein the average particle size of the tin particles is between 1 and 50 microns.

4. A catalyst according to claim 3 wherein the average particle size of the tin particles is between 1 and 5 microns.

5. A catalyst according to claim 1 wherein the Group VIII metal comprises platinum.

6. A catalyst according to claim 1 wherein the zeolitic support is selected from the group consisting of zeolite X, zeolite Y, and zeolite L.

7. A catalyst according to claim 6 wherein the zeolitic support is zeolite L.

8. A catalyst according to claim 1 wherein at least 80% of the Group VIII metal present in the catalyst is unreacted with the tin.

9. A catalyst according to claim 8 wherein at least 90% of the Group VIII metal present in the catalyst is unreacted with the tin.

10. A catalyst according to claim 9 wherein at least 95% of the Group VIII metal present in the catalyst is unreacted with the tin.

* * * * *